United States Patent
Yi et al.

(10) Patent No.: US 9,883,000 B2
(45) Date of Patent: Jan. 30, 2018

(54) SERVER-PUSH SERVICE IN HETEROGENEOUS NETWORK ENVIRONMENT

(71) Applicant: KT CORPORATION, Gyeonggi-do (KR)

(72) Inventors: Dong-Hoon Yi, Gyeonggi-do (KR); Tae-Sung Hur, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 107 days.

(21) Appl. No.: 14/877,866

(22) Filed: Oct. 7, 2015

(65) Prior Publication Data

US 2016/0100332 A1    Apr. 7, 2016

(30) Foreign Application Priority Data

Oct. 7, 2014 (KR) .......................... 10-2014-0135273

(51) Int. Cl.
| | |
|---|---|
| *H04L 1/00* | (2006.01) |
| *H04L 29/08* | (2006.01) |
| *H04W 4/12* | (2009.01) |
| *H04L 12/707* | (2013.01) |

(52) U.S. Cl.
CPC .............. *H04L 67/26* (2013.01); *H04W 4/12* (2013.01); *H04L 45/24* (2013.01)

(58) Field of Classification Search
CPC .. H04B 7/2121; H04B 7/2123; H04B 7/2615; H04B 7/212; H04B 7/2643; H04J 2203/0069; H04J 4/00; H04L 5/26; H04Q 2213/394; H04Q 2213/13511; H04Q 2213/348; H04W 28/26; H04W 72/04; H04W 72/12; H04W 76/00
USPC ................ 370/338, 329, 330, 341, 347, 348
See application file for complete search history.

(56) References Cited

U.S. PATENT DOCUMENTS

2013/0042017 A1* 2/2013 Zhang .................... H04H 20/95
709/231

FOREIGN PATENT DOCUMENTS

| KR | 10-2011-0029920 A | 3/2011 |
|---|---|---|
| KR | 10-2012-0012009 A | 2/2012 |

OTHER PUBLICATIONS

HTTP 2.0 (http://chimera.labs.oreilly.com/books/1230000000545/ch12.html).

* cited by examiner

*Primary Examiner* — Dady Chery
(74) *Attorney, Agent, or Firm* — IP Legal Services, LLC

(57) ABSTRACT

The disclosure is related identifying a push content frame at a transport layer and dynamically and selectively controlling a transmission path of a server push service by a server in a heterogeneous multipath transmission environment. The method may include determining whether frames are associated with the server push service when the frames are provided from an application layer to be transmitted to a user equipment, selecting at least one transmission path based on predetermined selection conditions from multiple transmission paths between the server and the user equipment, and transmitting, through the selected at least one transmission path, packetized frames associated with the server push service to the user equipment.

20 Claims, 5 Drawing Sheets

SERVER-PUSH SERVICE IN HETEROGENEOUS NETWORK ENVIRONMENT

CROSS REFERENCE TO PRIOR APPLICATIONS

The present application claims priority under 35 U.S.C. § 119 to Korean Patent Application No. 10-2014-0135273 (filed on Oct. 7, 2014).

BACKGROUND

The present disclosure relates communication and, more particularly, to controlling a transmission path for providing a server push service in a heterogeneous network environment.

Push technology is Internet-based communication technology that initiates a transmission request by a service provider, a publisher, or a central server. Such push technology might be an opposite concept of pull technology that initiates a transmission request by a client (e.g., user equipment).

Server push may denote a mechanism for sending unsolicited (asynchronous) data from a web server to a web browser. For example, server push is a new feature of hypertext transfer protocol (HTTP) 2.0, which enables a web server to transmit a predetermined part of essential resources to load a desired web page in advance without a HTTP Request from a client. Such a server push feature might significantly reduce a loading time of a desired web page on user equipment. That is, the server push feature advantageously enables pushing selected types of resources in advance. Such selected types of resources may be i) resources that significantly reduces a loading time of desired web pages, ii) resources that are related to predetermined contents having a higher rate of being selected by a user among other contents in a web page, iii) resources that are related to a predetermined event of a web page, or iv) resources that are related to predetermined advertisements included in a web page.

However, the server push transmits unrequested data from a server (e.g., a web server) to user equipment without permission or request from the user equipment. Such a feature might incur undesired cost for using a network, such as a commercial mobile communication network (e.g., AT&T® network or Verizon® mobile communication network.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present disclosure overcome the above disadvantages and other disadvantages not described above. Also, embodiments of the present disclosure are not required to overcome the disadvantages described above, and embodiments of the present disclosure may not overcome any of the problems described above.

In accordance with an aspect of the present embodiment, push contents of a server push service may be provided to a user equipment by controlling a transmission path of the push contents based on properties of the push contents and multiple transmission paths established between a server and the user equipment.

In accordance with another aspect of the present embodiment, frames of push contents may be transmitted through at least one transmission path selected from multiple transmission paths established between a server and a user equipment based on properties of the multiple transmission paths.

In accordance with still another aspect of the present embodiment, frames of push contents may be transmitted through a selected transmission path in a transmission order determined based on properties of the frame and the transmission paths.

In accordance with at least one embodiment, a method may be provided for controlling a transmission path of push contents by a server in a heterogeneous multipath transmission environment where the server may include at least one processor, at least one memory, and a communication circuit. The method may include monitoring transmission paths established between the server and a user equipment initiating a server push service and storing monitoring information; determining target push-contents to push, transmitting a push promise frame to the user equipment, and assigning and storing a push stream identifier (ID) associated with the user equipment and the determined target push-contents; determining whether a stream ID of each frame to be transmitted to the user equipment is associated with the stored push stream ID; and performing a transmission path control operation when the content ID is associated with the stored push steam ID.

The monitored information may include information on at least one of Internet Protocol (IP) addresses and ports of the subflows.

The performing a transmission path control operation may include determining whether the monitored transmission paths include transmission paths that satisfy predetermined selection conditions, transmitting the determined push contents to the user equipment through the satisfied transmission paths when the monitored transmission paths include transmission paths satisfying the predetermined selection conditions. Otherwise, the transmission of the determined push contents may be postponed.

The method may further include deleting the push stream ID when the transmission of the determined push contents is completed or when a postponing timer of the determined push contents is expired.

The determined push contents may be transmitted to the user equipment through one transmission path that is selected from multiple transmission paths satisfying the predetermined selection conditions based on predetermined selection conditions.

The determined push contents may be transmitted to the user equipment through multiple transmission paths satisfying the predetermined selection conditions based on predetermined selection conditions.

The performing a transmission path control operation may include determining a transmission order for sequentially transmitting push-contents based on priorities of the push-contents, where the priorities are determined and assigned to the push-contents properties of the push-contents.

The performing a transmission path control operation may include determining a transmission order for sequentially transmitting push-contents based on priorities of the selected transmission path, where the priorities are determined and assigned to the push-contents properties of the selected transmission path.

In accordance with another embodiment, a method may be provided for controlling a transmission path of a server push service by a server in a heterogeneous multipath transmission environment. The server may include at least one processor, at least one memory, and a communication circuit. The method may include determining whether frames are associated with the server push service when the frames are requested to be transmitted to a user equipment, selecting at least one transmission path based on predetermined selection condition from the multiple transmission paths, and transmitting, through the selected at least one transmission path, the frames associated with the server push service to the user equipment.

Prior to the determining, the method may further include receiving a request for predetermined contents from the user equipment, monitoring transmission paths established to the user equipment based on information included in the request, and storing and managing the monitoring results.

Prior to the determining, the method may further include determining target push contents to be transmitted to the user equipment as the server push service, assigning a push stream identifier (ID), and storing information on the push stream ID in connection with information on the requested contents and the user equipment.

The determining may include determining a stream ID of each frame is associated with a push stream ID assigned to push contents for the server push service and determining that the frame is for the server push service when the stream ID is associated with the assigned push stream ID.

The selecting may include obtaining priorities of the multiple transmission paths and selecting at least one having a priority higher than a predetermined reference from the multiple transmission paths.

The priorities may be determined and assigned to the multiple transmission paths based on properties of the multiple transmission paths. Furthermore, the priorities may be determined and assigned to the multiple transmission paths based on priorities of the push contents.

The selecting may include obtaining priorities of the multiple transmission paths and selecting one incurring no cost to the user equipment from the multiple transmission paths.

The method may further include determining a transmission order for sequentially transmitting frames of the push contents and transmitting the frames through the selected at least one transmission path based on the determined transmission order.

The transmission order may be determined based on priorities assigned to the push contents and priorities assigned to the selected at least one transmission path. The priorities of the push contents may be determined based on properties of the push contents, and the priorities of the selected at least one transmission path may be determined based on properties of the selected at least one transmission paths.

In accordance with still another embodiment, a server may be provided for controlling a transmission path of a server push service in a heterogeneous multipath transmission environment. The server may include at least one processor, at least one memory, and a communication circuit. The at least one processor may be configured to determine whether frames are associated with the server push service when the frames are requested to be transmitted to a user equipment, to select at least one transmission path from the multiple transmission paths, and to transmit, through the selected at least one transmission path, the frames associated with the server push service to the user equipment.

BRIEF DESCRIPTION OF THE DRAWINGS

The above and/or other aspects of some embodiments of the present invention will become apparent and more readily appreciated from the following description of embodiments, taken in conjunction with the accompanying drawings, of which.

DETAILED DESCRIPTION OF EMBODIMENTS

Figure 1:
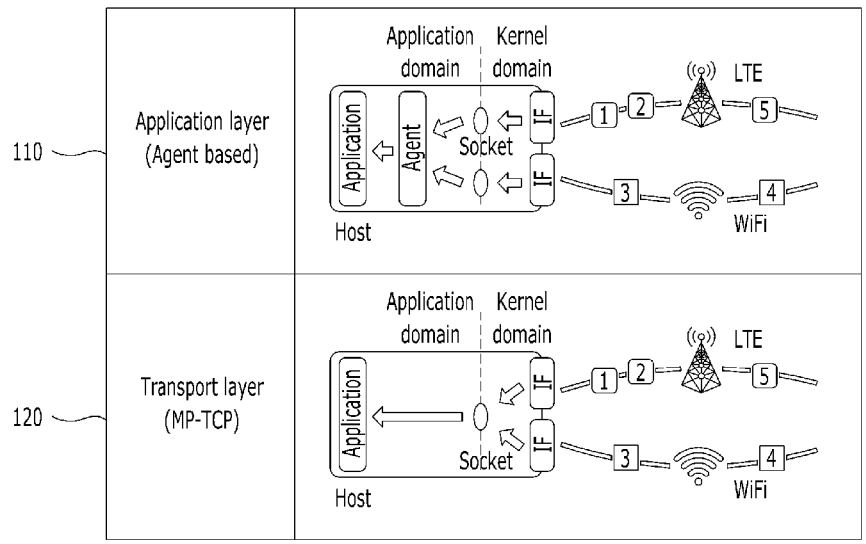
FIG. 1 is a diagram for describing multi-interface simultaneous transmission in heterogeneous communication environment.

Reference will now be made in detail to exemplary embodiments of the present disclosure, examples of which are illustrated in the accompanying drawings, wherein like reference numerals refer to like elements throughout. The embodiments are described below, in order to explain embodiments of the present disclosure by referring to the figures.

FIG. 1 is a diagram for describing multi-interface simultaneous transmission in heterogeneous communication environment.

Referring to FIG. 1, multi-interface simultaneous transmission may enable a user terminal, such as a server and user equipment, having multiple network interfaces to simultaneously transmit a plurality of frames of contents through multiple transmission paths. That is, target contents may divided into a plurality of frames, and the plurality of frames may be transmitted to a desired destination through multiple network interfaces of the user terminal and through corresponding transmission paths (e.g., LTE/3G connection and WiFi connection). Such a multi-interface simultaneous transmission may be performed using one of an application layer (e.g., agent based) and a transport layer (e.g., multipath transmission control protocol: MP-TCP) to simultaneously transmit data through multiple interfaces of the user terminal (e.g., a dual radio mobile terminal). For example, diagram 110 exemplary illustrates multi-interface simultaneous transmission using the application layer. In case of using the application layer, a dedicated agent controls each TCP session using a plurality of independent sockets. An application layer of a receiving end is required sorting the received frames. Accordingly, it may require modification of an application service layer at the receiving side in such an application layer based multi-interface simultaneous transmission.

In FIG. 1, diagram 120 illustrates multi-interface simultaneous transmission using the transport layer (MP-TCP). In this case, a kernel layer may generate subflows and control the generated subflows using a single TCP socket. Such a method does not require modification of the application service layer because the kernel layer sorts the received frames at a receiving end.

As described, typical multi-interface simultaneous transmission technologies have disadvantages and drawbacks. In case of the simultaneous data transmission using the application layer, since the simultaneous data transmission technology using the application layer requests contents using an independent socket, it is difficult to implement an interface of user equipment at a server side. Furthermore, it is also difficult to cooperate with hypertext transfer protocol (HTTP) 2.0 standards because HTTP 2.0 standards use a single TCP connection. The simultaneous data transmission using MP-TCP might be easier, as compared with the simultaneous data transmission using application layer, to cooperate with HTTP 2.0 standards because it is comparable with a typical application layer and requires modification only in a service server.

As described, such typical multi-interface simultaneous transmission does not define a method for controlling a transmission path according to a type of each service or content. Furthermore, the typical multi-interface simultaneous transmission does not define a method for enabling a transport layer to identify a type of each content or service to transmit.

In accordance with at least one embodiment, a transport layer of a service server may be enabled to recognize frames of push contents which are generated and transferred from an application layer of a service server. When an application layer of the service server generates the frames of push contents, the application layer of the service server may generate a push-content stream identifier (ID), include the generated push-content stream ID to headers of the frames of push contents, and store information on the generated push-content stream ID with the assigning information in a predetermined mapping table. Before the service server transmits the frame, a transport layer of the service server determines whether a frame is associated with the push-content stream ID based on the predetermined mapping table. When the frame is associated with the push-content stream ID, the service server may initiate a transmission path control procedure in order to transmit push contents differently from frames of normal contents in accordance with at least one embodiment.

In accordance with another embodiment, upon the recognition of the push content frames, the service server may perform transmission path control to select at least one transmission path based on predetermined priorities of transmission paths and transmit the push content frames through the selected transmission path. Furthermore, the service serve may determine a transmission order of such push contents based on priorities of a transmission path and contents.

In accordance with at least one embodiment, such an operation for enabling a transport layer to recognize push content frames and for controlling a transmission path of the push contents may be performed in a heterogeneous network environment where a server provides a server push service to a user equipment based on HTTP 2. However, the embodiments of the present disclosure are not limited thereto. Hereinafter, such an operation for enabling a transport layer to recognize push contents and controlling a transmission path of a frame between user equipment and a server according to a type of contents in a heterogeneous network environment in accordance with at least one embodiment will be briefly described with reference to FIG. 2.

Figure 2:
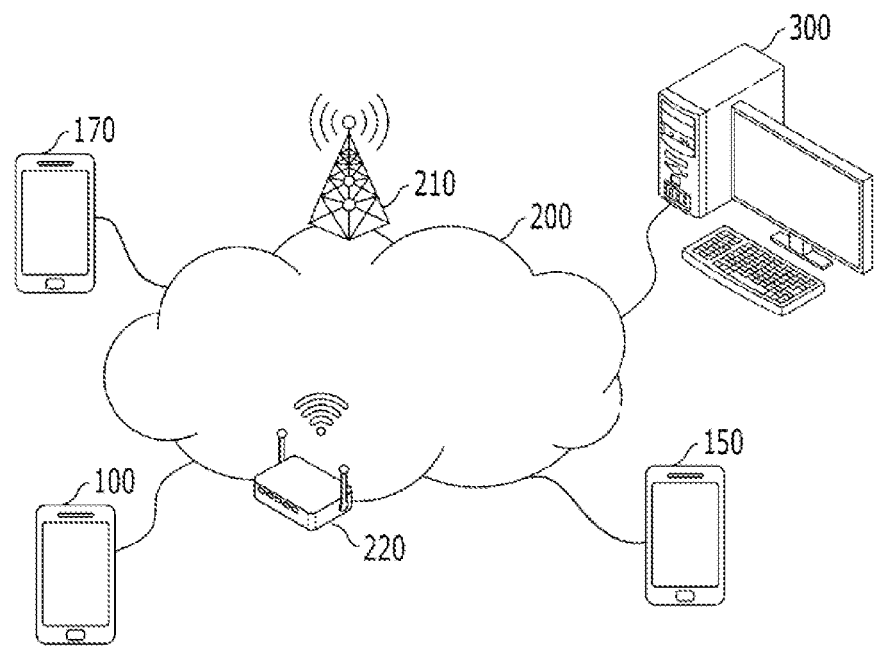
FIG. 2 illustrates transmission paths of push contents in a heterogeneous multipath transmission environment in accordance with at least one embodiment.

FIG. 2 illustrates transmission paths of push contents in a heterogeneous multipath transmission environment in accordance with at least one embodiment.

Referring to FIG. 2, a heterogeneous multipath transmission environment may be exemplary shown in the diagram. The heterogeneous multipath transmission environment may be referred to as multi-path transmission control protocol (MP-TCP) environment. In such a heterogeneous multipath transmission environment, user equipment 100 and server 300 may communicate with each other through multiple communication connections. For example, user equipment 100 may establish two communication connections to server 300. In particular, one communication session may be established using commercial mobile communication network 210 and the other communication session may be established using free wireless data communication network 220. Here, such commercial mobile communication network 210 may denote a circuit switched network, for example, a long term evolution (LTE) or 3G mobile communication network, provided by a commercial service provider, such as AT&T® or Verizon®. Such commercial mobile communication network 210 charges users (e.g., user equipment) with a predetermined fee per a unit data amount or a unit time when the users use mobile communication network 210 to receive/transmit data. Wireless data communication network 220 may denote a packet data network, usually but not limited to, established through WiFi® technology. In accordance with at least one embodiment, wireless data communication network 220 denotes a network that does not charge a user based on an amount of data transmitted through wireless data communication network 200. For example, such wireless data communication network 200 may include a commercial network that charges a user when the user uses the network. However, wireless data communication network 200 does not charge a user based on an amount of data. Such a usage charging condition of each communication network may be one of properties thereof. Furthermore, priorities of communication networks may be determined based on the properties of the communication networks in accordance with at least one embodiment. The properties of each communication network may include a transmit rate, a delay rate, an error rate, and so forth.

In accordance with at least one embodiment, server 300 may determine a type of frames of push contents to be transmitted to user equipment 100 and control a transmission path of frames according to the determined type and the priorities of the transmission path.

As shown in FIG. 2, server 300 may be coupled to user equipment 100, 150, and 170 through communication network 200 in accordance with at least one embodiment. Such server 300 may be a computing system i) including at least one processor, at last one memory, and at least one communication circuit, ii) owned and managed by a service provider providing services associated with a server push service, iii) supporting multi-path simultaneous transmission, and iv) performing operations related to dynamically controlling a transmission path according to a type of push contents.

For example, server 300 may be a web server providing web contents to clients (e.g., user equipment 100, 150, and 170) based on HTTP 2 including a server push service that pre-emptively send responses to a client in association with a previous client-initiated request. That is, when user equipment 100 requests a request for web contents through a predetermined web browser, server 300 may find requested web contents in response to the request, determine whether the requested web contents are associated with push contents for server push, and provide the requested web contents with the server push contents to user equipment 100 in accordance with at least one embodiment.

When user equipment 100 requests contents to server 300, user equipment 100 and server 300 establish a communication link (e.g., communication session or communication sub flows). Server 300 may i) monitor information on sub flows (SUB_FLOW, or sessions) each having a different transmission path and ii) store the monitored information. Server 300 may iii) determine target push-contents to transmit, which are associated with the requested contents in order to provide a server push service to user equipment 100 based on HTTP 2. Then, server 300 may iv) transmit a push promise frame (PUSH_PROMISE DATA FRAME) to user equipment 210 and v) assign a push stream ID (PUSH STREAM ID) to the determined push contents and store the assigning information with the push stream ID in a predetermined mapping table. For example, in server 300, an application layer may generate a push stream ID, include the generated push stream ID in a header of each frame of the push contents, and store information on the generated push stream ID in a form of a mapping table.

When server 300 transmits the frames to user equipment 100, server 300 may vi) determine whether a stream ID of a frame to be transmitted is associated with the stored push stream ID. If the stream ID of the frame is associated with the push stream ID based on the predetermined stored information, which may be stored in a form of a mapping table, server 300 may vii) initiate controlling of a transmission. For example, in server 300, a transport layer may read value in predetermined bits of a frame from an application layer and determine whether the read value is matched with the push stream ID stored in a mapping table. In particular, the value in the predetermined bits of the frame may be a value in 31 bits (from $40^{th}$ bit to $71^{st}$ bit) of the frame, but the present embodiment is not limited thereto. For example, in HTTP 2 standard, a frame format is defined to include a length field (24 bits), a type field (8 bits), a flag field (8 bits), and a stream identifier field (31 bits). Since the transport layer cannot identify each fields in the frame from the application layer, the transport layer of server 300 may read a value in predetermined bits associated with the stream identifier field.

The value in the predetermined bits of the frame is compared with the push stream ID stored in the mapping table. For example, FIG. 4 exemplary shows information table 420 (e.g., a mapping table). That is, such stored information table 420 may include information on a push stream ID (e.g., Push Stream ID) associated with corresponding user equipment and requested contents.

Figure 4:
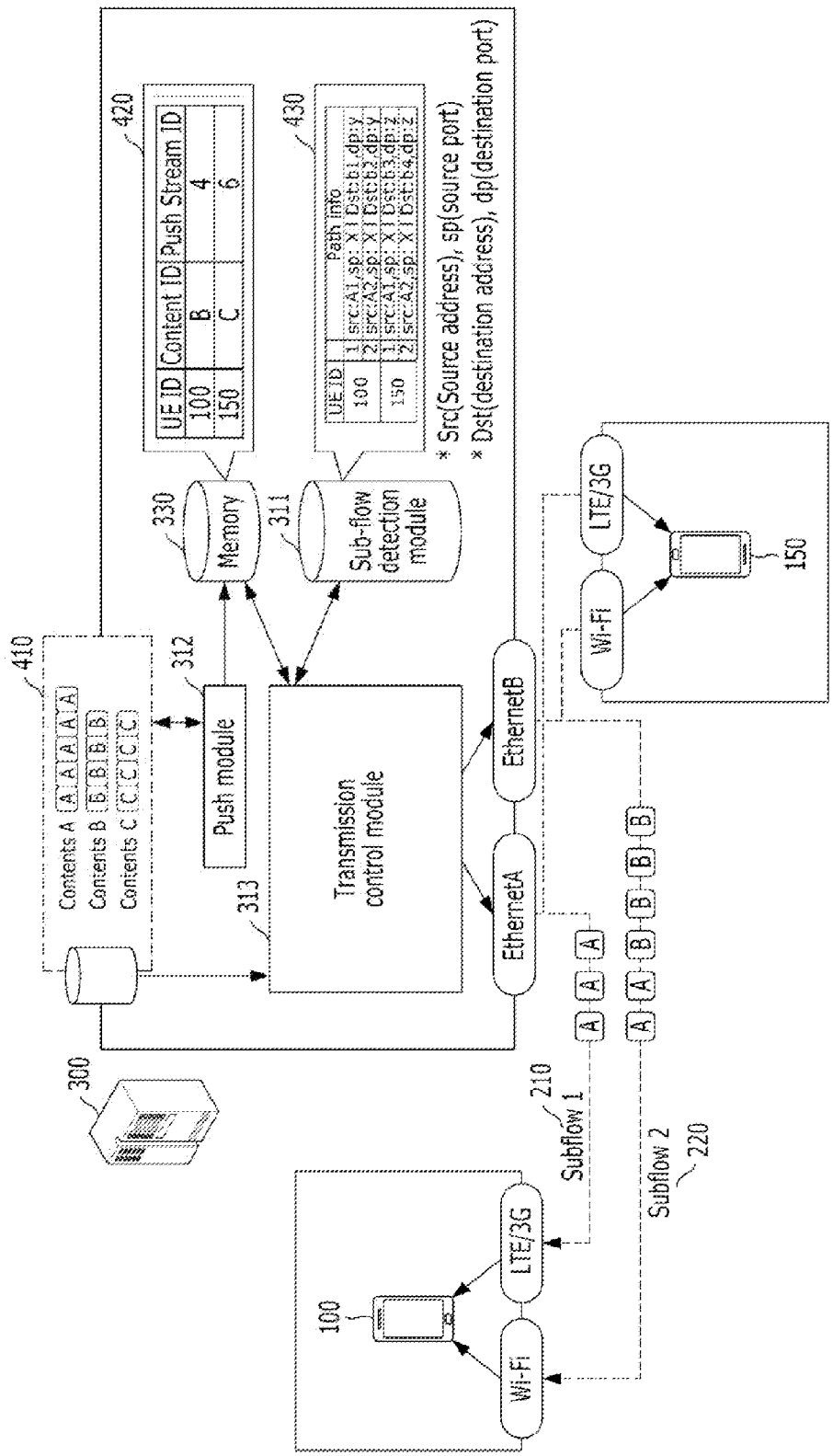
FIG. 4 is a diagram illustrating operations of selectively and dynamically controlling a transmission path of push contents in a heterogeneous multipath transmission environment (MP-TCP) in accordance with at least one embodiment.

As described, server 300 may detect and monitor information on subflows between server 300 and each one of user equipment 100, 150, and 170. Such monitored subflow information may include information on a source Internet protocol (IP) address, a source port, a destination IP address, and a destination port of each subflow. Herein, the subflow may denote communication network connections or sessions established between server 300 and each one of user equipment 100, 150, and 170. Such subflow information may be stored in a form of a mapping table 430 as shown in FIG. 4.

For example, a first communication network connection may be LTE connection (e.g., LTE subflow) 210 and a second communication network connection may be WiFi connection (e.g., WiFi subflow) 220, as shown in FIG. 2.

In accordance with at least one embodiment, server 300 may identify frames of push contents associated with a server push service based on a push stream ID assigned to frames of the push contents and stored in a predetermined mapping table with information on associated main contents and user equipment in accordance with at least one embodiment. Based on the push stream ID stored in the predetermined mapping table, server 300 may identify frames of push contents and selectively and dynamically control transmission paths of the identified push content frames.

After identifying the frames of the target push-contents, server 300 may i) determine the monitored subflows include multiple transmission paths that satisfy predetermined conditions, ii) transmit frames of push-contents to user equipment 210 through at least one transmission path when the monitored subflows include transmission paths satisfying predetermined conditions, or iii) postpone the transmission of frame of the push-contents when no transmission path satisfying predetermined conditions is included in the monitored subflows. Furthermore, server 300 may delete the push stream ID i) when transmission of all frames of the push-contents is completed and ii) a predetermined postponing time of the push contents is expired.

In accordance with at least one embodiment, server 300 may i) select one transmission path, based on predetermined selection conditions, from the multiple transmission paths satisfying the predetermined conditions associated with a target subflow, and ii) transmit push-contents through the selected transmission path to user equipment 210. However, the embodiments of the present disclosure are not limited thereto. For example, server 300 may transmit the push-contents to the user equipment 210 through all of the multi transmission paths that satisfy the predetermined conditions associated with the target subflow.

In accordance with at least one embodiment, server 300 may decide an order of transmitting push-contents based on priorities set based on properties of push-contents. For example, server 300 may set a priority of each push-content based on properties of a corresponding push-content, such as a type of contents (e.g., an image, a text, a moving picture, and so forth) and a size of contents.

For example, server 300 may determine a transmission order of push-contents according to priorities set based on properties of a transmission path in accordance with at least one embodiment. In particular, server 300 may decide a transmission order of push-contents based on priorities assigned thereto. The priorities of the push-contents may be set based on properties of transmission paths, such as a bandwidth, a transmission delay, a fee-charging method, and so forth. Server 300 may determine a bandwidth of a transmission path is narrower than a predetermined threshold bandwidth. When the bandwidth of the transmission path is narrower, server 300 may transmit small-sized push-contents at first. When the bandwidth of the transmission path is wider, server 300 may transmit push-contents regardless of a size of the push-contents. In addition, when the transfer delay is greater than a predetermined threshold delay, server 300 may transmit push-contents of image or moving image at first.

In accordance with at least one embodiment, user equipment 100, 150, and 170 may request predetermined contents to server 300, such as web contents through a predetermined web-browser. In response to such a request, user equipment

100, 150, and 170 may receive the requested contents with push contents provided based on a server push service of server 300. User equipment 100 may have multiple network interfaces and supports simultaneous transmission and HTTP 2, but the present embodiments are not limited thereto.

For example, user equipment 100 may include at least one hardware component configured to and/or at least one of software programs and/or applications (e.g., a web browser) programed to perform operations for receiving the server push service (e.g., receiving push-contents from server 300). For example, user equipment 100 may include at least one processor, at least one memory, and communication circuits that supports multiple network interfaces, such as dual radio capability.

In particular, user equipment 100 may be a hand-held device, such as a portable wireless communication device including a personal communication system (PCS) device, a global system for mobile communication (GSM) device, a personal digital cellular (PDC) device, a personal handyphone system (PHS) device, a personal digital assistant (PDA) device, an International mobile telecommunication-2000 (IMT-2000) device, a code division multiple access (CDMA) device, a wideband code division multiple access (WCDMA) device, a wireless broadband internet (WiBro) device, a smart phone, a smart pad, a tablet PC, and so forth.

In particular, user equipment 100 may be equipped with a communication circuit having multiple network interfaces for supporting multipath simultaneous transmission (MP-TCP) and a heterogeneous communication network. For example, user equipment 100 may include communication interfaces for WiFi®, LTE®/3G, and WiBro communication.

In accordance with at least one embodiment, user equipment 100 may download at least one of applications (e.g., web browser) produced and distributed by a service provider, a communication service provider, a server push service provider, and a third party. Such application may be preinstalled at user equipment 100 with an operating system of user equipment 100 or may be downloaded from server 300 and installed in user equipment 100. In response to an input from a user, user equipment 100 may execute the application, produce a dedicated user interface for requesting contents (e.g., web contents) that initiates a server push service of server 300 and display the user interface for enabling the user to control the server push service in connection with server 300.

For example, user equipment 100 may request server 300 for predetermined web contents. In response to such request, user equipment 100 and server 300 may establish communication link (e.g., session or subflow) through communication network 200. Such request may include information on requested target contents, user identification information (e.g., user account information, service registration information, user profile information), user equipment identification information (e.g., simultaneous transmission capability, server push service capability, dual connectivity capability, multiple communication interface capability, device specification, telephone number, Internet Protocol (IP) address, port information), related network connection information (e.g., a related communication service provider, related sub flow information, connection status information, related network statues), and the request service information (e.g., a service type, a service duration, a related push service type, a content type of the request service, and so forth). Server 300 may collect information from the requested, monitor subflows to user equipment 100, and store monitored information in a database (e.g., memory 330).

Communication network 200 may enable user equipment 100 to communicate with server 300 using predetermined communication technologies and protocols. For example, communication network 200 may employ technologies and protocols associated with, but not limited to, Wi-Fi 220, Bluetooth, a local area network (LAN), a wireless LAN, a wide area network (WAN), a personal area network (PAN), a 3G/LTE communication technology 210, and a 4G communication technology.

In particular, communication network 200 may include Internet, Wireless local area network (WLAN), wide area network (WAN), personal area network (PAN), third generation partnership project (3GPP), long term evolution (LTE), wireless fidelity (WiFi) network, world interoperability for microwave access (WiMAX) network, and wireless gigabit (WiGig) network. Through such communication network 200, user equipment 100 may receive target push contents through at least one of transmission paths formed through LTE network 210 and WiFi network 220 in accordance with at least one embodiment.

As described, server 300 may perform various operations for dynamically and selectively controlling transmission paths of push contents in accordance with at least one embodiment. Such operation and configuration of server 300 will be described in detail with reference to FIG. 3.

Figure 3:
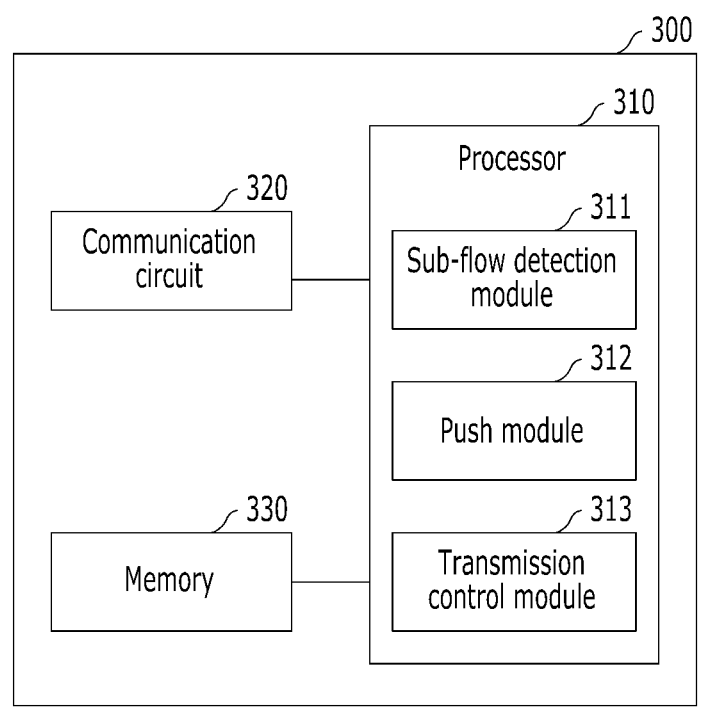
FIG. 3 illustrates a server for dynamically and selectively controlling a transmission path for a server push service in accordance with at least one embodiment.

FIG. 3 illustrates a server for dynamically and selectively controlling a transmission path for a server push service in accordance with at least one embodiment.

Referring to FIG. 3, server 300 may processor 310, communication circuit 320, and memory 330. Processor 310 may include subflow detection module 311, push module 312, and transmission path control module 313.

Communication circuit 320 may include a transmitter and a receiver for establishing at least one of communication links (e.g., subflow) to user equipment 100 through communication network 200. Through the established communication links, the communication circuit 320 may receive information from or transmit information to user equipment 100. For example, communication circuit 320 may perform communication based on Digital Subscriber Line (xDSL), Hybrid Fiber Coaxial (HFC), Power Line Communication (PLC), satellites, GSM EDGE Radio Access Network (GERAN), UMTS Terrestrial Radio Access Network (UTRAN), evolved UMTS Terrestrial Radio Access Network (eUTRAN), Wireless Local Area Network (WLAN), WiFi, Long term evolution (LTE), and Worldwide Interoperability for Microwave Access (WiMAX), or a mobile communication network based on CDMA/WCDMA or GSM/GPRS. That is, communication circuit 320 may include at least one of hardware component and software component for supporting multipath simultaneous transmission and MP-TCP in accordance with at least one embodiment.

When both server 300 and user equipment 100 support multipath simultaneous transmission, server 300 may directly control subflows. When only user equipment 100 supports multipath transmission, push module 312 may be implemented in server 300 but path control module 330 may be implemented in a MP-TCP proxy (not shown). Hereinafter, for convenience and ease of understanding, it is assumed that both server 300 and user equipment 100 support multiple path transmission. However, embodiments of the present disclosure are not limited thereto.

Subflow detection module 311 may monitor subflows associated with user equipment 100 and store information on the associated subflows (SUB_FLOW) each having different transmission paths. For example, the transmission paths may include WiFi transmission path 220, LTE/3G transmission path 210, and a WiBro transmission path. Subflow detection module 311 may store information such as a source address, a source port, a destination address, and a destination port as shown in 430 of FIG. 4.

Push module 312 may determine target push-contents to be pushed based on contents requested by user equipment 100, transmit a push-promise frame of the target push-contents to user equipment 300, assign and store a push stream ID of the target push-contents in a predetermined mapping table with information data ID of the requested contents. That is, push module 312 may generate a push stream ID, include the push stream ID in a header of each frame of push contents, as a stream identifier, and store the information on the push stream ID and the assigning information in a form of a mapping table.

Based on such a mapping table, a transport layer of server 300 may identify the frames of the push contents. For example, the transport layer of server 300 may determine whether a data stream ID of the requested contents is associated with the push-stream ID based on the mapping table. That is, the transport layer may read a value in predetermined bits of a header of the frame and compare the read value with a push stream ID stored in a mapping table. If the read value is identical to the stored push stream ID, the transport layer may determine that the frame is associated with the push contents.

Push module 312 may transmit a push promise frame to user equipment 100 before pushing a predetermined content (e.g., push-contents). Such a push promise frame may be a reservation message. When both server 300 and user equipment 100 supports the multipath simultaneous transmission, push module 312 may store the assigned push stream ID in a form of a mapping table in memory 330 (e.g., a dedicated database stored in memory 330). When only user equipment 100 supports the multipath simultaneous transmission, push module 312 may store the push stream ID in a MP-TCP proxy (not shown).

Transmission control module 313 may control a transmission path in accordance with at least one embodiment. That is, upon detection of push-contents by push module 330, transmission control module 313 may perform a transmission path control procedure.

Transmission control module 313 may decide a transmission order of push-contents according to priorities of each push-content. Such a priority of each push-content may be assigned based on properties of push-contents. For example, the priority may be determined and assigned based on a type (e.g., an image, a text, and a moving image) of contents and a size of contents.

For example, transmission control module 313 may transmit push-contents in an order of a text, an image, and a moving image. Furthermore, transmission control module 313 may randomly transmit push-contents when the push-contents have a size smaller than a predetermined threshold size. Transmission control module 313 may transmit push-contents in an order of smaller push-contents to larger push-contents when the push-contents have a size larger than a predetermined threshold size.

Transmission control module 313 may decide a transmission order base on priorities assigned based on properties of each transmission path. Transmission control module 313 may determine and assign priorities based on a bandwidth and a transmission delay of each transmission path.

For example, transmission control module 313 may transmit a push-content having a smaller size at first when a transmission path has a bandwidth smaller than a threshold bandwidth. Transmission control module 313 may transmit push-contents regardless of sizes of push-contents when a transmission path has a bandwidth wider than a threshold bandwidth.

Furthermore, when a transmission delay becomes greater than a predetermined transmission delay threshold, transmission control module 313 may transmit text contents before image contents and/or moving image contents in accordance with at least one embodiment.

Transmission control module 313 may determine whether subflows include any transmission paths that satisfy predetermined conditions. Such transmission paths that satisfy predetermined conditions may be a communication network providing a free communication service, a communication network not charging a user by an amount of data, a communication network having a high transmit rate, or a communication network providing a charged communication service by a service provider. That is, the predetermined conditions may be a condition to select a communication session established through a WiFi communication network that does not charge a user by an amount of data transmitted therethrough. As shown in FIG. 2, subflow 2 may be a WiFi communication network. Furthermore, such a satisfied transmission path may be a communication network selected for the server push feature by a user through user equipment 100.

Transmission control module 313 may select one of the satisfied transmission paths based on a predetermined selection reference and transmit target push-contents to the user equipment 100 through the selected transmission path. The predetermined selection reference may include a cost, an activation time, a transmission quality, the number of hops, and so forth.

Alternatively, transmission control module 313 may transmit target push-contents through multiple transmission paths simultaneously when the multiple transmission paths satisfy the predetermined conditions. Furthermore, transmission module 350 may transmit target push-contents using the multiple transmission paths by rotation. However, the embodiments of the present disclosure are not limited thereto.

As described, server 300 may perform various types of operations for dynamically and selectively controlling transmission paths of target push contents according to a type thereof in accordance with at least one embodiment. Such operation will be described based on an example with reference to FIG. 4. For example, FIG. 4 shows user equipment 100 establishes two communication links to server 300 through two different communication networks, LTE communication link 210 and Wi-Fi communication link 220. Under such a communication environment, server 300 provides a server push service to user equipment 100.

FIG. 4 is a diagram illustrating operations of selectively and dynamically controlling a transmission path of push contents in a heterogeneous multipath transmission environment (MP-TCP) in accordance with at least one embodiment.

Referring to FIG. 4, when user equipment 100 requests contents A to server 300, server 300 may determine whether the requested contents A are associated with server push contents. When the requested contents A are associated with push contents B as shown in block 410 of FIG. 4, server 300 may transmit push-contents B together with the requested contents A to user equipment 100 as a server push service in accordance with at least one embodiment. Here, the requested contents may be web contents. Such web contents may include various types of contents and resources, such as text, image, moving image, advertisement contents, event contents, and so forth.

For example, in order to transmit the requested contents A and the associated push contents B, such contents are divided into a plurality of frames including a headers frame, a data frame, a priority frame, a RST_stream frame, a settings frame, a push promise frame, a ping frame, a goaway frame, a window update frame, and a continuation frame. Each frame may have a header containing information such as identifier (e.g., stream identifier), a length, a type, flags, and so forth. Such identifier may be stored in predetermined bits (e.g., 31 bits from $41^{st}$ bits of a frame). That is, the requested contents A may be divided into a plurality of frames A. Each frame A may include an associated stream ID in a header. The requested contents A may be associated with push-contents B for a server push service. Such push-contents B may be divided into a plurality of frames B, as shown in a diagram 410 of FIG. 4.

In accordance with at least one embodiment, server 300 (e.g., application layer) may i) assign a push stream ID, as a stream ID, to push contents, ii) include the assigned push stream ID in predetermined bits of each frame, and iii) store information on the push stream ID in a form of a mapping table as shown in block 420 of FIG. 4. For example, mapping table 420 may include user equipment ID (e.g., user equipment 100, user equipment 150), content ID, and assigned push stream ID.

In server 300, a transport layer may be i) provided with frames from the application layer and ii) identify whether each frame is associated with push contents or not. That is, server 300 (e.g., transport layer) may read a value in predetermined bits of each frame and compare the read value with the stored push stream ID based on the mapping table 420. For example, such operation may be performed when a socket application program interface (API) is called, but the present embodiment is not limited thereto. Such a method may enable a transport layer of server 300 to recognize push contents to be transmitted to user equipment. The transport layer may packetize the frames from the application layer, perform the transmission path control when the frames are associated with the server push service, and transmit the packetized frames (e.g., packets) to a desired destination through at least one selected transmission path.

Subflow detection module 311 may detect and monitor subflows associated with a user equipment that requests the predetermined contents (e.g., web contents) based on information in the request and store information on the monitored subflows. In FIG. 4, first subflow 210 may be a LTE/3G transmission path and second subflow 220 may be a WiFi transmission path. The LTE/3G transmission path may represent a communication session or a communication link established through a commercial communication network charging a user based on an amount of data transmitted and/or received therethrough. Second subflow 220 may be a WiFi transmission path. The WiFi transmission path may represent a communication session or a communication link established through a communication network not charging a user based on an amount of data transmitted and/or received therethrough. Subflow detection module 311 may store the monitored information in a form of a mapping table as shown in block 430 of FIG. 4. In particular, mapping table 430 may include information on user equipment identification, a source IP address, a source port, a destination IP address, and a destination port.

Upon the request of contents A, the server push service may be initiated. For example, push module 312 determines push-contents B associated with the requested contents A. Then, push module 312 assigns a push stream ID to push contents B and stores the assigned push stream ID with information on the corresponding push contents B in a form of a mapping table (e.g., table 420).

Push module 312 may transmit a push promise frame to user equipment requesting contents, such as user equipment 100 and user equipment 150. For example, an integer 4 is assigned to the target push contents B as a push stream ID and such information may be stored with information on associated user equipment 100 as shown in table 420. For another example, an integer 6 is assigned to target push contents C as a push stream ID and such information may be stored with information on associated user equipment 150 as shown in table 420. Based on such information 420, the transport layer of server 300 may be enabled to recognize push content frames in accordance with at least one embodiment.

Transmission control module 313 may determine whether subflows include at least one transmission path satisfying predetermined selection conditions. For example, when the selection condition is a free communication network not charging a user or a communication network not charging a user based on an amount of data, transmission path control module 131 selects the WiFi transmission path 220 as a transmission path satisfying the selection condition.

Then, transmission control module 313 may determine a transmission order of push-contents based on priorities set based on properties of push-contents or based on properties of transmission paths. For example, transmission control module 313 decides to sequentially transmit push-contents in an order of large sized contents to small sized contents. That is, transmission control module 313 decides to sequentially transmit moving image contents, image contents, and text contents. As selecting the transmission path and the transmission order, server 300 transmits the frames B of the target push contents to user equipment 100 through the WiFi transmission path 220 in order of moving image contents, image contents, and text contents.

As described above, server 300 may recognize frames of push contents at a transport layer level, select optimal transmission paths for a server push service, packetize the frames of the push-contents, and transmit the packetized frames (e.g., packets) of push-contents to user equipment 100 through the selected transmission paths in accordance with at least one embodiment. Hereinafter, operations of server 300 will be described in detail with reference to FIG. 5 and FIG. 6.

Figure 5:
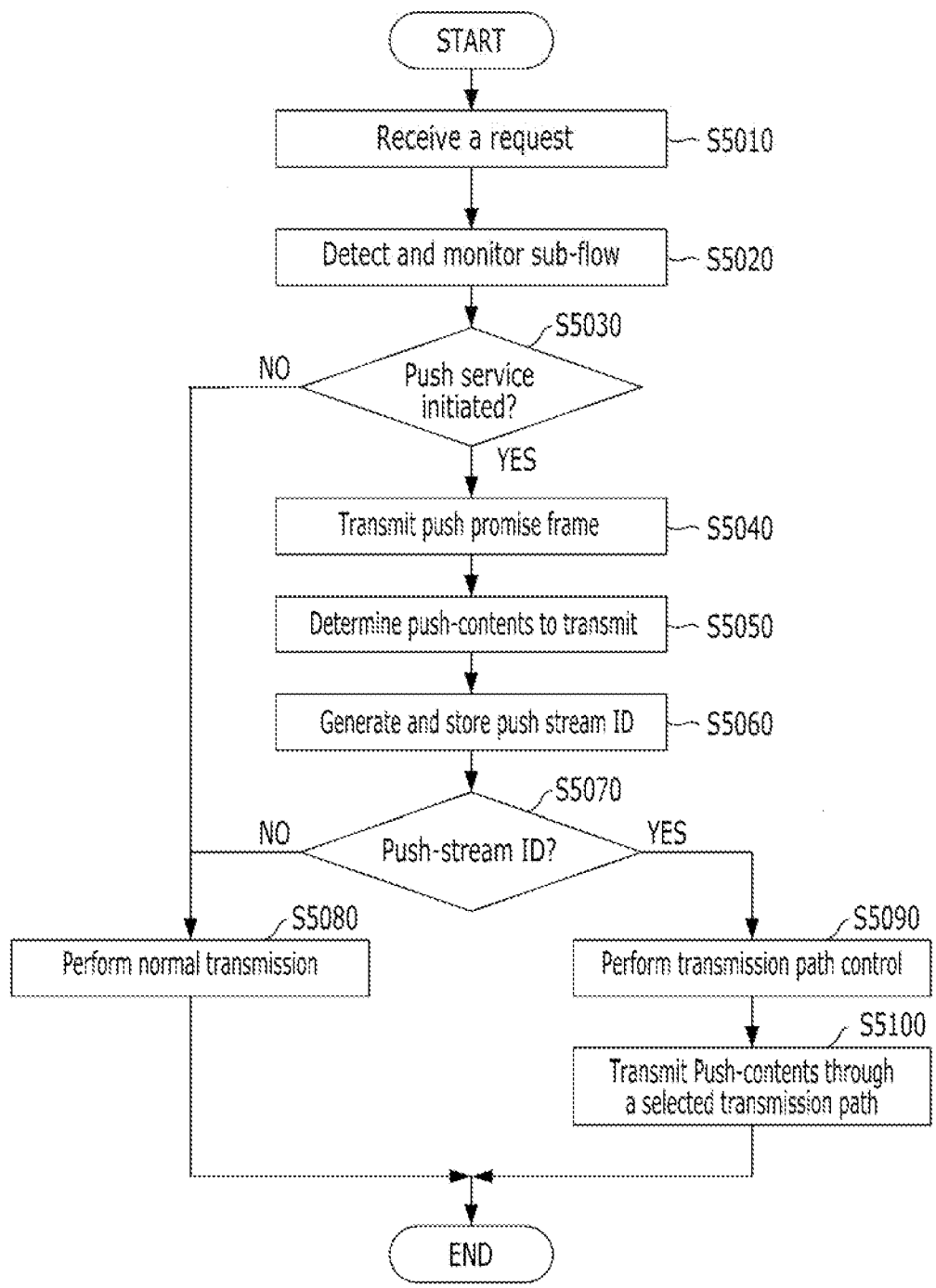
FIG. 5 illustrates a method for controlling a transmission path of a server push service in a heterogeneous network environment in accordance with at least one embodiment.

FIG. 5 illustrates a method for controlling a transmission path of a server push service in a heterogeneous network environment in accordance with at least one embodiment.

Referring to FIG. 5, a content request may be received at step S5010. For example, user equipment 100 may request predetermined contents to server 300. That is, through a web browser, user equipment 100 may request predetermined web contents A to server 300. Such a request may include information on user equipment 100, the user, serving communication networks, the service associated with a server push service, and/or the requested server push service in accordance with at least one embodiment. That is, server 300 may collect, from the request, user identification information (e.g., user account information, service registration information, user profile information), user equipment identification information (e.g., simultaneous transmission capability, server push service capability, dual connectivity capability, multiple communication interface capability, device specification, telephone number, Internet Protocol (IP) address), related network connection information (e.g., a related communication service provider, related sub flow information, connection status information, related network statues), and the request service information (e.g., a service type, a service duration, a related push service type, a content type of the request service, and so forth). Server 300 may store the collected information in a database (e.g., memory 330) by each registered user, manages the stored information, and updates the information upon generation of a predetermined event.

At step S5020, a monitoring and storing procedure may be performed. For example, server 300 may detect and monitor communication status and communication connections to user equipment 100 based on the collected information associated with user equipment 100. That is, server 300 may monitor information on sub flows (SUB_FLOW) each having a different transmission path. As monitoring result, server 300 may store the monitored information as shown in diagram 430 of FIG. 4.

At step S5030, determination may be made so as whether requested contents are associated with a server push service. For example, server 300 may determine whether the requested web contents A are associated with push contents B.

When the requested contents are not associated with the server push service (No—S5030), the requested contents may be transmitted through a typical transmission procedure at step S5080. When the requested contents are associated with the server push service (Yes—S5030), a push promise frame may be transmitted at step S5040. For example, server 300 may transmit the push promise frame to user equipment 100 in order to inform user equipment 100 in advance.

At step S5050, target push contents may be determined. For example, server 300 may determine push contents B associated with the requested contents A. At step S5060, a push stream ID may be assigned and assigning information may be stored. For example, server 300 (e.g., application layer) may assign the push stream ID "4" for the push contents B, include the assigned push stream ID "4" as a stream identifier in a header of each frame, and stores such assigning information of the push contents B in a form of a mapping table.

At step S5070, determination may be made so as whether a frame is associated with a server push service. When a transport layer is provided with frames from an application layer, the transport layer of server 300 may determine whether the provided frames are associated with the push contents based on the mapping table (e.g., 420 of FIG. 4). In particular, the transport layer may read a value in predetermined bits in a header of each frame and compare the read value with a push stream ID stored in the mapping table.

When the frame is not associated with the server push service (No—S5070), a normal transmission procedure may be performed at step S5080. For example, server 300 determine that the frames are not push contents and transmits the frames without transmission path control.

When the frame is associated with the push stream ID based on the mapping table (Yes—S5070), a transmission path control procedure may be performed at step S5090. For example, the transport layer of server 300 determines that frames are associated with push contents and perform the transmission path control. That is, server 300 may select at least one transmission path satisfying predetermined selection conditions.

Furthermore, server 300 may determine a transmission order of the frames based on properties of the selected transmission path and/or properties of the frames of the push contents. Such a transmission path control procedure will be described in detail with reference to FIG. 6 below.

At step S5100, the target push contents may be transmitted through at least one of the selected transmission path. For example, after selecting at least one transmission path, the transport layer of server 300 may packetize the frames provided from the application layer and transmit the packetized frames (e.g., packets) through the selected transmission path in the determined transmission order.

As described, in step S5090, at least one optimal transmission path and a transmission order may be selected and determined based on various properties of target push contents and/or each transmission path in accordance with at least one embodiment. Hereinafter, such a transmission path control procedure will be described in detail with reference to FIG. 6.

Figure 6:
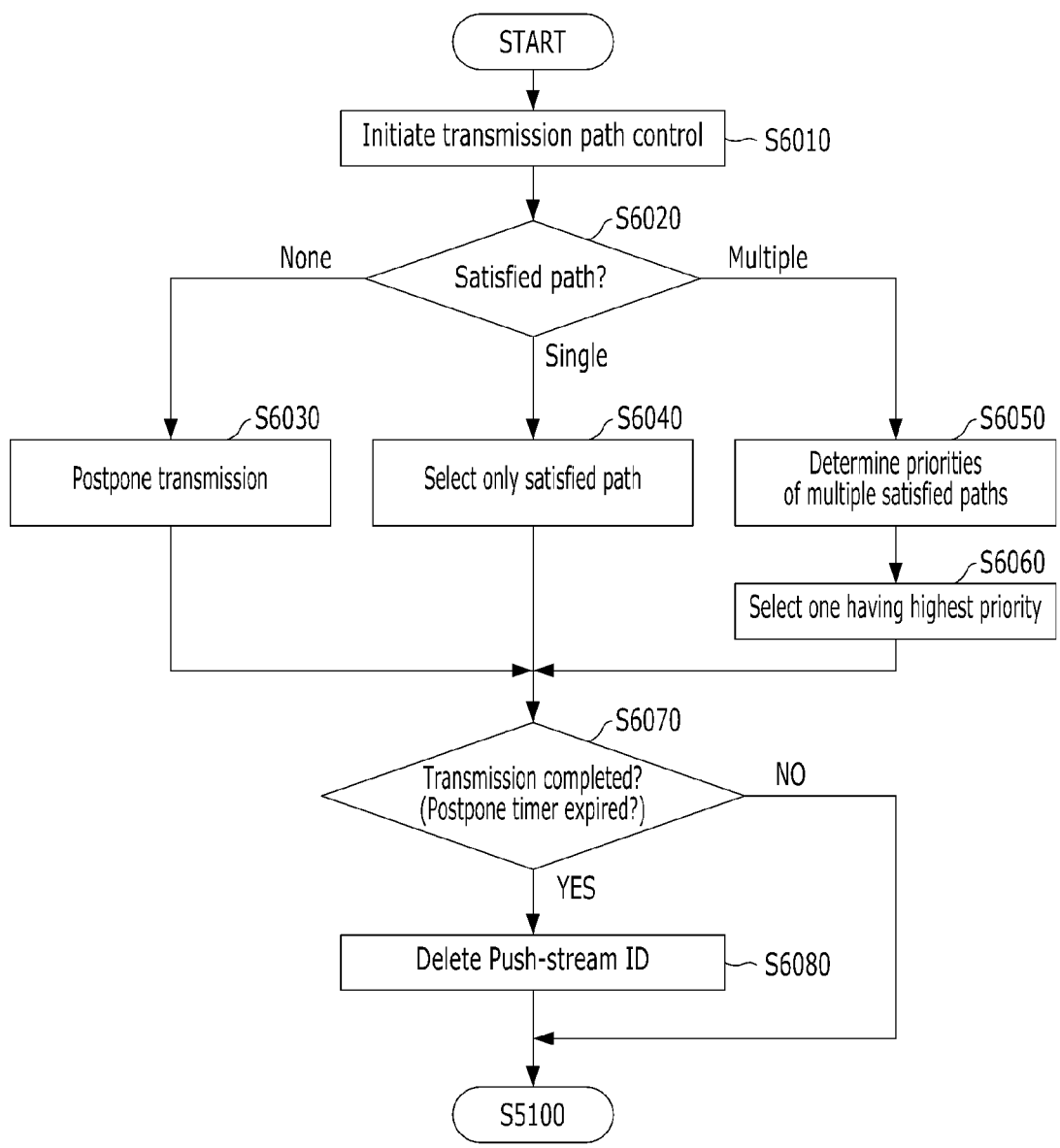
FIG. 6 illustrates a method for controlling transmission paths of push-contents in accordance with at least one embodiment.

FIG. 6 illustrates a method for controlling transmission paths of push-contents in accordance with at least one embodiment.

Referring to FIG. 6, as described, a transmission path control procedure may be initiated when a stream ID of a frame is associated with a stored push stream ID at step S6010. At step S6020, server 300 may determine whether subflows between user equipment 100 and server 300 include multiple transmission paths that satisfy predetermined selection conditions. When the subflows include none of transmission paths (Nono—S6020), the transmission of the target push contents may be postponed at step S6030. For example, when there is no transmission path that satisfies the predetermined selection conditions, server 300 may start a postpone timer and postpone transmission of the corresponding frames.

When the subflows include only single transmission path (Single-S6020), server 300 selects the single transmission path that satisfies the predetermined selection conditions to transmit the target push-contents at step S6040. When the related and monitored subflows include multiple transmission paths (Multiple-S6020), server 300 obtains priorities of multiple satisfied transmission paths and compares the obtained priorities at step S6050. As described, such priorities may be determined and assigned based on properties of transmission paths and push contents.

At step S6060, server 300 selects at least one from the multiple transmission paths satisfying the selection conditions based on the comparison result. For example, server 300 selects one having the highest priority as the optimal transmission path. The highest priority may be a transmission path established through a communication network that does not charge a user at all or a communication network that does not charge a user based by an amount of data transmitted or received therethrough.

After selecting the optimal transmission path, server 300 decides an order of transmitting push-contents based on priorities set based on properties of push-contents. For example, server 300 may set a priority of each push-content based on properties of a corresponding push-content, such as a type of contents (e.g., an image, a text, a moving picture, and so forth) and a size of contents. Furthermore, server 300 may determine a transmission order of push-contents according to priorities set based on properties of a transmission path. In this case, server 300 may decide a transmission order of push-contents based on priorities set based on properties of transmission paths, such as a bandwidth, a transmission delay, and so forth.

At step S6070, server 300 may determine whether the entire transmission procedure is completed or whether the postpone timer is expired. When the entire transmission procedure is completed or when the postpone timer is expired (Yes—S6070), server 300 may delete the push stream ID at step S6080. Otherwise, server 300 packetizes the frames and transmits the packetized frames (e.g., packets) of the push contents through the selected transmission path based on the determined transmission order at step S5100.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The present invention can be embodied in the form of methods and apparatuses for practicing those methods. The present invention can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

No claim element herein is to be construed under the provisions of 35 U.S.C. §112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of controlling a transmission path of push contents by a server in a heterogeneous multipath transmission environment where the server includes at least one processor, at least one memory, and a communication circuit, the method comprising:

monitoring transmission paths between the server and a user equipment and storing monitoring information;

determining target push-contents to push, transmitting a push promise frame to the user equipment, and assigning a push stream identifier (ID) to the determined target push-contents and storing information on the assigned push stream ID with information on the user equipment;

determining whether frames to be packetized are associated with a server push service based on the stored push stream ID; and performing a transmission path control operation when the frames are determined to be associated with the server push service based on the stored push steam ID, wherein the performing a transmission path control operation includes:

transmitting the frames of the determined target push-contents to the user equipment through at least one transmission path selected based on a predetermined selection condition from the monitored transmission paths.

2. The method of claim 1, wherein the monitored information includes information on at least one of Internet Protocol (IP) addresses and ports associated with the transmission paths.

3. The method of claim 1, wherein the performing a transmission path control operation comprises:

determining whether the monitored transmission paths include at least one transmission path that satisfies the predetermined selection condition;

transmitting the determined target push-contents to the user equipment through the satisfied at least one transmission path when the monitored transmission paths include the at least one transmission path satisfying the predetermined selection condition;

otherwise, postponing transmission of the determined target push-contents.

4. The method of claim 3, wherein the transmitting the determined target push-contents comprises:

transmitting the determined target push-contents to the user equipment through one transmission path that is selected based on the predetermined selection condition from multiple transmission paths satisfying the predetermined selection condition.

5. The method of claim 3, wherein the transmitting the determined target push-contents comprises:

transmitting the determined target push-contents to the user equipment through multiple transmission paths that satisfy the predetermined selection condition.

6. The method of claim 1, further comprising:

deleting the push stream ID when the transmission of the determined target push-contents is completed or when a postponing timer of the determined target push-contents is expired.

7. The method of claim 1, wherein the performing a transmission path control operation comprises:

determining a transmission order for sequentially transmitting the target push-contents based on priorities of the target push-contents, where the priorities are determined and assigned to the target push-contents based on properties of the target push-contents.

8. The method of claim 1, wherein the performing a transmission path control operation comprises:

determining a transmission order for sequentially transmitting the target push-contents based on priorities of the selected at least one transmission path, where the priorities are determined and assigned to the target push-contents based on properties of the selected at least one transmission path.

9. A method of controlling a transmission path of a server push service by a server in a heterogeneous multipath transmission environment where the server includes at least one processor, at least one memory, and a communication circuit, the method comprising:

determining whether frames provided from an application layer are associated with the server push service when the frames are requested to be transmitted to a user equipment;

selecting at least one transmission path based on a predetermined selection condition from multiple transmission paths established between the user equipment and the server; and transmitting, through the selected at least one transmission path, the frames associated with the server push service to the user equipment, wherein the determining is performed based on a push stream identifier (ID) assigned to target push-contents to be pushed to the user equipment.

10. The method of claim 9, prior to the determining, further comprising:

receiving a request for predetermined contents from the user equipment;

monitoring the multiple transmission paths established to the user equipment based on information included in the request; and storing and managing the monitoring results.

11. The method of claim 9, prior to the determining, further comprising:

determining the target push-contents to be transmitted to the user equipment as the server push service;

assigning the push stream identifier (ID) to the target push-contents; and storing information on the assigned push stream ID, the target push-contents, and the user equipment in a form of a mapping table.

12. The method of claim 9, wherein the determining comprises:

reading a value in predetermined bits of each frame provided from an application layer;

determining whether the read value is associated with the push stream ID assigned to the target push-contents for the server push service; and determining that frame is for the server push service when the read value is associated with the assigned push stream ID.

13. The method of claim 9, wherein the selecting comprises:

obtaining priorities of the multiple transmission paths; and selecting at least one having a priority higher than a predetermined reference from the multiple transmission paths.

14. The method of claim 13, wherein the priorities are determined and assigned to the multiple transmission paths based on properties of the multiple transmission paths.

15. The method of claim 13, wherein the priorities are determined and assigned to the multiple transmission paths based on priorities of the target push-contents.

16. The method of claim 9, wherein the selecting comprises:

obtaining priorities of the multiple transmission paths; and selecting one transmission path that does not charge the user equipment based on an amount of data used from the multiple transmission paths.

17. The method of claim 9, further comprising:

determining a transmission order for sequentially transmitting packetized frames of the target push-contents; and transmitting the packetized frames through the selected at least one transmission path based on the determined transmission order.

18. The method of claim 17, wherein:

the transmission order is determined based on priorities assigned to the target push-contents and priorities assigned to the selected at least one transmission path;

the priorities of the target push-contents are determined based on properties of the target push-contents; and the priorities of the selected at least one transmission path are determined based on properties of the selected at least one transmission path.

19. A server of controlling a transmission path of a server push service in a heterogeneous multipath transmission environment, the server comprising at least one processor, at least one memory, and a communication circuit, wherein the at least one processor is configured to:

determine whether frames provided from an application layer are associated with the server push service when the frames are requested to be transmitted to a user equipment;

select at least one transmission path based on a predetermined selection condition from multiple transmission paths established between the user equipment and the server; and packetize the frames associated with the server push service and transmit the packetized frames to the user equipment through the selected at least one transmission path; and wherein the determining of the at least one processor is performed based on a push stream identifier (ID) assigned to target push-contents to be pushed to the user equipment.

20. The server of claim 19, wherein the at least one processor is configured to:

determine a transmission order for sequentially transmitting the packetized frames of the target push-contents; and transmit the packetized frames through the selected at least one transmission path based on the determined transmission order.

* * * * *